United States Patent
Seth et al.

(10) Patent No.: US 9,760,380 B2
(45) Date of Patent: Sep. 12, 2017

(54) USING GRAMMAR TO SERIALIZE AND DE-SERIALIZE OBJECTS

(75) Inventors: Gaurav Seth, Redmond, WA (US); Jianchun Xu, Issaquah, WA (US); Geoffrey M. Kizer, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 329 days.

(21) Appl. No.: 13/419,441

(22) Filed: Mar. 14, 2012

(65) Prior Publication Data

US 2013/0247003 A1    Sep. 19, 2013

(51) Int. Cl.
| | |
|---|---|
| *G06F 9/44* | (2006.01) |
| *G06F 9/445* | (2006.01) |
| *G06F 17/22* | (2006.01) |
| *G06F 9/455* | (2006.01) |

(52) U.S. Cl.
CPC ........ *G06F 9/4435* (2013.01); *G06F 9/44521* (2013.01); *G06F 9/45512* (2013.01); *G06F 17/2247* (2013.01); *G06F 17/2288* (2013.01)

(58) Field of Classification Search
CPC ...... G06F 9/44; G06F 9/4435; G06F 17/2247; G06F 17/2288; G06F 9/44521; G06F 9/45512
USPC ........................................................ 717/115
See application file for complete search history.

(56) References Cited

U.S. PATENT DOCUMENTS

| | | | |
|---|---|---|---|
| 5,923,878 A * | 7/1999 | Marsland ............ | G06F 9/44521 717/139 |
| 7,376,698 B2 | 5/2008 | Pik et al. | |
| 2003/0172197 A1 | 9/2003 | Dencker et al. | |
| 2005/0108627 A1* | 5/2005 | Mireku ............... | G06F 17/2288 715/234 |
| 2006/0090164 A1 | 4/2006 | Garden et al. | |
| 2007/0112714 A1* | 5/2007 | Fairweather ........... | G06F 8/427 706/46 |
| 2007/0239499 A1* | 10/2007 | Shukla .................... | G06F 9/485 705/7.26 |
| 2012/0176159 A1* | 7/2012 | Webb, III .............. | G04F 10/00 327/18 |

OTHER PUBLICATIONS

"Deep Cloning Using Binary Serialization", Retrieved at <<http://www.blackwasp.co.uk/DeepClone.aspx> 2010, pp. 2.*

(Continued)

*Primary Examiner* — Wei Zhen
*Assistant Examiner* — Mohammed Huda
(74) *Attorney, Agent, or Firm* — Dicke, Billig & Czaja, PLLC (57) ABSTRACT

Aspects of the subject matter described herein relate to serializing and de-serializing objects. In aspects, a serialization engine uses a grammar to serialize data into a binary representation. The serialization engine may call upon a host serialization engine to serialize embedded object that are not directly supported by the environment hosting the serialization engine. The serialization engine may encode the grammar used to serialize the data into the serialized data for use in de-serializing the data. After the object is serialized, the serialized data may be de-serialized when desired by using the grammar. The grammar is such that it causes embedded objects and relationships to be preserved in the serialized representation of the object.

20 Claims, 4 Drawing Sheets

(56) References Cited

OTHER PUBLICATIONS

"Deep Cloning Using Binary Serialization", Retrieved at <<http://www.blackwasp.co.uk/DeepClone.aspx>> Jun. 4, 2010, pp. 2.

Dahan, Udi, "Optimizing a Large Scale Software + Services Application", Retrieved at <<http://msdn.microsoft.com/en-us/magazine/dd569749.aspx>> , Apr. 2009, pp. 10.

"NET for Java Developers Migrating to C#", Retrieved at <<http://book.javanb.com/NET-For-Java-Developers-Migrating-To-Csharp/0672324024_ch15lev1sec8.html>> Retrieved Date: Dec. 29, 2011, pp. 9.

"Deep Cloning of Objects Using Binary Format", U.S. Appl. No. 13/293,734, filed Nov. 10, 2011, pp. 46.

* cited by examiner

USING GRAMMAR TO SERIALIZE AND DE-SERIALIZE OBJECTS

BACKGROUND

Programming environments may have different formats for the same object types. For example, one programming environment may represent a date using 16 bits while another programming environment may represent a date with 32 bits. Furthermore, one programming environment may have an object type that another programming environment does not have. In addition, during execution, an object may reference objects of the execution environment or an environment outside of the execution environment. Moreover, programs may be implemented on different processing architectures that have different processing word lengths, different ordering of bits for representing the same data, and other differences. These and other factors are a challenge when attempting to share dynamic language objects between two environments.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to serializing and de-serializing objects. In aspects, a serialization engine uses a grammar to serialize data into a binary representation. The serialization engine may call upon a host serialization engine to serialize embedded object that are not directly supported by the environment hosting the serialization engine. The serialization engine may encode the grammar used to serialize the data into the serialized data for use in de-serializing the data. After the object is serialized, the serialized data may be de-serialized when desired by using the grammar. The grammar is such that it causes embedded objects and relationships to be preserved in the serialized representation of the object.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
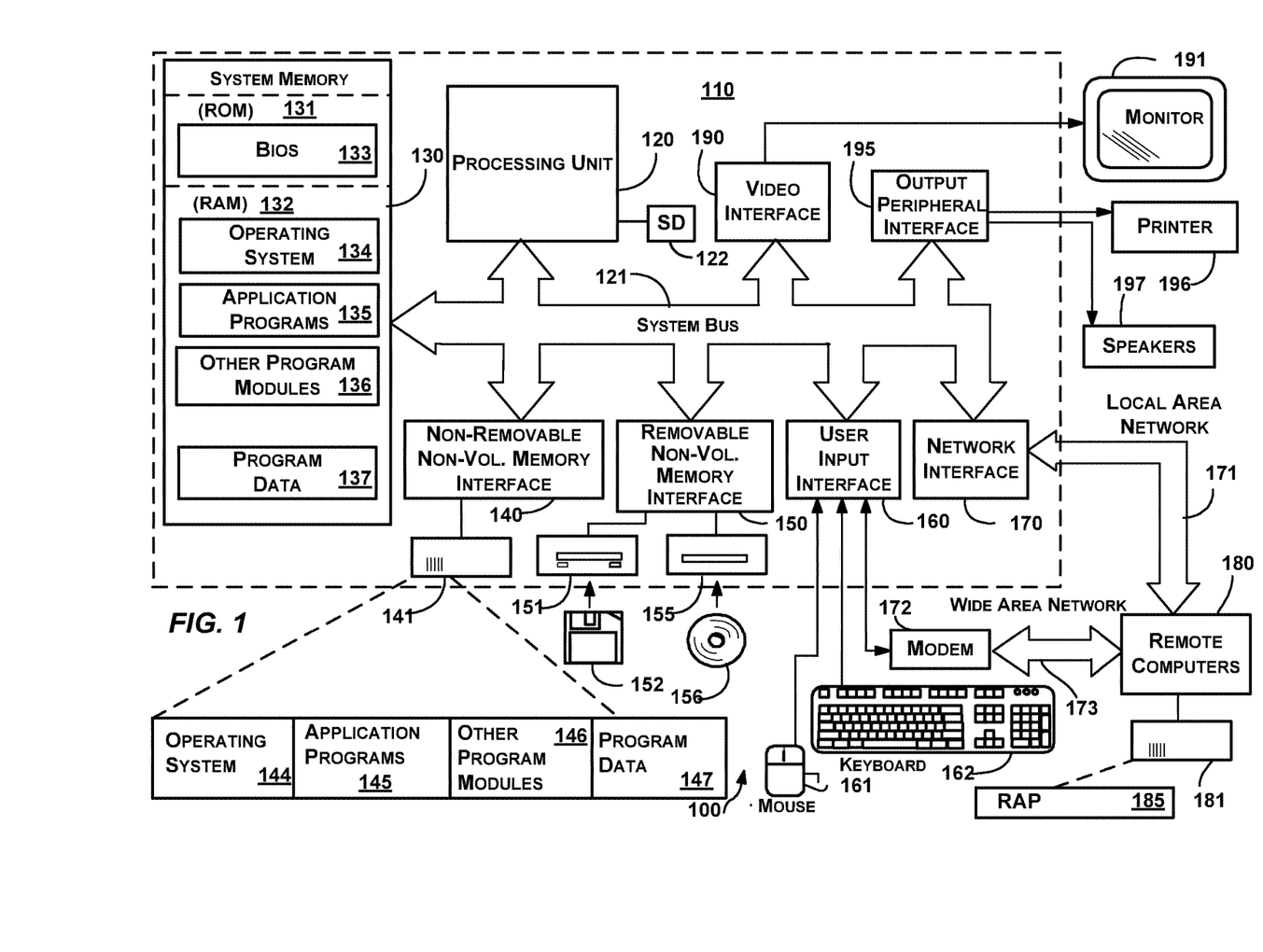
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Grammar and Serialization

Figure 2:
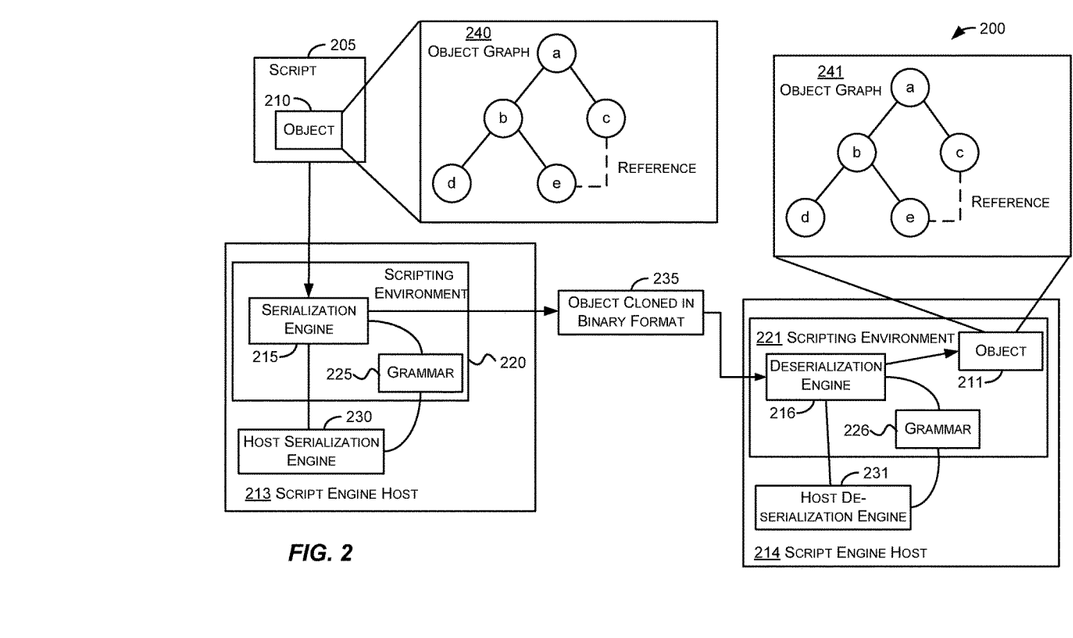
FIG. 2 is a block diagram that represents an exemplary environment in which aspects of the subject matter described herein may operate.

As mentioned previously, different programming environments may represent the same types of data differently, may not have equivalent representations, or may have other interoperability challenges. FIG. 2 is a block diagram that represents an exemplary environment in which aspects of the subject matter described herein may operate. The components illustrated in FIG. 2 are exemplary and are not meant to be all-inclusive of components that may be needed or included. In other embodiments, the components and/or functions described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

The system 200 may include a script 205, an object 210, an object 211, a script engine host 213, a script engine host 214, a serialization engine 215, a deserialization engine 216, a scripting environment 220, a scripting environment 221, a grammar 225, a grammar 226, a host serialization engine 230, a host deserialization engine 231, and may include other components (not shown). As used herein, the term component is to be read to include all or a portion of one or more devices, a collection of one or more software modules or portions thereof, some combination of one or more software modules or portions thereof and one or more devices or portions thereof, and the like. The object 210 may be represented by an object graph 240 while the object 211 may be represented by an object graph 241.

The script 205 may include code formatted according to a scripting language. Some exemplary scripting languages include shell scripts, Web browser scripting languages including ECMAScript® and its various dialects, text processing languages, general purpose dynamic languages, and the like.

The object 210 is any entity that may be manipulated by the commands of a programming language. Some examples of objects include values, variables, functions, data structures, entities that include properties and methods, and the like. An object may include or reference other objects.

The scripting environment 220 may be an environment that executes the script 205. The scripting environment 220 may be implemented using a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. In one embodiment, an entity comprises a process as defined above. In another embodiment, an entity comprises any one or more objects that is/are capable of performing actions associated with or using or one or more processes. The scripting environment may be hosted by the script engine host 213 which in turn may be hosted on a physical or virtual machine.

A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth.

More than one virtual environment may be hosted on a single computer. That is, two or more virtual environments may execute on a single physical computer. To software executing in each virtual environment, the virtual environment appears to have its own resources (e.g., hardware) even though the virtual environments hosted on a single computer may physically share one or more physical devices with each other and with the hosting operating system.

In one embodiment, the scripting environment 220 may be the same environment as the scripting environment 221. And the script engine host 213 the same as the script engine host 214. In other words, the same environment that serialized an object may subsequently desire to de-serialize the object. In another embodiment, the scripting environment 220 and the scripting environment 221 may be different environments hosted on the same or different script engines. In another embodiment, the scripting environment 220 and the scripting environment 221 may be different environments hosted on the same or different script engine hosts. If the scripting environment 220 and the scripting environment 221 are hosted on different script engine hosts, they may, nevertheless, still be hosted on the same machine or machines or may be hosted on different machines.

For various reasons, it may be desirable to make a deep copy of an object. A deep copy of an object includes references to other objects, if any, included in the object and may include copies of the objects that are included in the object. A deep copy may enable cross architecture and interoperable communication scenarios including, for example, storing objects in databases, sharing objects across processes for computation to improve performance, availability, scalability, and the like. To ensure that objects can be cloned in such a way that that they can be shared and recreated effectively by one of more execution environments written in the same or different language and potentially running across different processor architectures, a grammar may be utilized as described in more detail below.

As used herein, a grammar may be represented as a set of rules that defines a format for serializing (e.g., turning into a binary format) an object. A grammar may define a header and a payload. The header of the serialized data may include metadata for the grammar that may be used for de-serialization activities. For example, the metadata may include a version of the grammar used to serialize the serialized data. This version may be used, for example, by a de-serialization engine to determine whether the de-serialization engine may de-serialize the serialized data.

As another example, the header may include other contextual and metadata information about the grammar, the serialization, the script environment and/or the script engine host. For example, if it is known that the same de-serialization engine will be used to de-serialize the serialized data, the metadata of the header may include a flag that allows the de-serialization engine to know this. In response, the de-serialization engine may de-serialize the serialized data in a manner based on this knowledge. As another example, the metadata may indicate that only scripting objects have been serialized into the serialized data or that scripting objects and host object have been serialized into the serialized data. Using this metadata, the de-serialization engine may de-serialize the serialized data in a more efficient manner.

The payload may include data for each descendent object of an object. A descendent object is any object that is part of the object. In the object graph 240, the descendent objects are b, c, d, and e.

The payload may also include reference data for each reference, if any, included in the object. The reference data indicates relationships of the object. The reference data may refer to one or more of: an object type and value supported by a scripting environment in which the object resides, an object type and value supported by a host environment of the scripting environment, and a foreign object type and value that are defined outside of both the scripting environment and the host environment.

As illustrated in FIG. 2, the object 210 is serialized by the serialization engine 215 to create a binary representation 235. This binary representation 235 is de-serialized by the deserialization engine 216 to create the object 211. Semantically, the object 210 and the object 211 are identical even though physically, they may be represented by different lengths, ordering, and combinations of bits in the two scripting environments 220 and 221, both of which may exist on two separate platform architectures.

The object 210 may include one or more descendant objects as well as one or more references. A reference may reference one or more of:

1. An object type and value supported by a scripting environment in which the object resides (e.g., the scripting environment 220);

2. An object type and value supported by a host environment of the scripting environment (e.g., the script engine host 213); and 3. A foreign object type and value that are defined outside of both the scripting environment and the host environment. A foreign object type may include a custom object type or an object type of a software framework, runtime, or of software component upon which the script engine host 213 executes, for example.

In serializing the object 210, the serialization engine 215 may traverse the object graph 240 and serialize or cause to be serialized each object and reference found therein. For objects having types that are supported by the scripting environment 220, the serialization engine 215 may consult the grammar 225 to serialize the objects. For objects having types that are defined outside of the scripting environment 220, the scripting serialization engine 215 may request a serialization from the host serialization engine 230.

In response to a request to serialize an object, the host serialization engine 230 may also consult the grammar 220 and may return data (e.g., a sequence of bits) corresponding to the serialized object. The host serialization engine 230 may also return an identifier for the object that the host serialization engine 230 has serialized. This identifier may be used in de-serializing the object.

The serialization engine 215 may place the serialized data that is a binary representation 235 of the object 210 into volatile and/or nonvolatile memory, which may be on the system where the script engine host 213 is executing, on another system, or in the cloud. The deserialization engine 216 may then obtain the serialized data and de-serialize the data to create the object 211.

Deserialization may proceed similarly to serialization. The deserialization engine 216 may consult the grammar 226 to determine the format of the binary representation 235. The grammar 226 may be the same as the grammar 225 or it may be a different version of the grammar 225. If the grammar 226 is a different version of the grammar 225, it may or may not be able to be used to de-serialize the binary representation 235 of the object 210.

If the grammar 225 and the grammar 226 are different, the grammar 225 may vary from the grammar 226 by a minor version or a major version. In one implementation, if the grammar 225 varies from the grammar 226 by a minor version only, the grammar 226 may be used to de-serialize the binary representation 235. If the grammar 225 varies from the grammar 226, however, the grammar 226 may not be used to de-serialize the binary representation 235.

In another embodiment, different rules may be applied to the major and/or minor versions of the grammars 225 and 226 to deduce whether the grammars a compatible with each other. If the grammars are deduced to be incompatible, the grammar 226 may not be used to de-serialize the binary representation 235. If the grammars are deduced to be compatible, de-serialization may proceed.

In another embodiment, the metadata and contextual information may be used to select a specific version of the grammar to be used for serialization. For example, if it is known that the object will be de-serialized by the same engine, a certain version of the grammar may be selected. As another example, if the object only includes scripting objects, this may influence the choice of the version used for serialization. Other metadata and contextual information may be used to select a version of the grammar used for serialization without departing from the spirit or scope of aspects of the subject matter described herein.

If the grammar 226 can be used to de-serialize the binary representation 235, the scripting deserialization engine 216 consults the grammar 226 to de-serialize the binary representation 235. If the scripting deserialization engine 216 finds binary data for an object that is defined outside of the scripting environment 221, the deserialization engine 216 may request that the host deserialization engine 231 de-serialize the object. After the scripting deserialization engine 216 and the potentially the host deserialization engine 231 have de-serialized the binary representation 235 using the grammar 226, the object 211 is created which semantically is identical to the object 210.

A grammar may specify the ordering of bits for a binary representation of an object such that the ordering of the bits within the serialized data to represent the object is independent of the processing architecture of the computer. Thus, whether the processor of a computer uses Little Endian, Big Endian, or another format does not influence the ordering of bits in the serialized representation of the object.

In one embodiment, the grammar used to serialize and de-serialize objects may have the following rules:

1. Binary representation follows Little Endian format. In an alternative embodiment, the binary representation may follow Big Endian format or a format that mixes Little Endian and Big Endian format.

2. Values in the binary representation may be 4-byte aligned (e.g., placed on 4 byte boundaries by adding padding if needed). In an alternative embodiment, the binary representation may be N-byte aligned where N is selectable.

3. Byte length of strings may be based on UTF-16 format (e.g., 2 bytes per character of the string). In an alternative embodiment, the byte length of strings may be based on a different number of bytes per character of the string.

4. Difference between Major Version of the serialization engine that serialized an object and the Major Version of a deserialization engine indicates that the deserialization engine is not capable of de-serializing the binary representation. In an alternative embodiment, this restriction may be different or eliminated.

5. Difference between Minor Version of the serialization engine that serialized an object and the Minor Version of a deserialization engine indicates that the deserialization engine is capable of de-serializing the binary representation. In an alternative embodiment, differences in Minor Versions may indicate that the deserialization engine is not able to de-serialize the binary representation.

6. Each object type for which cloning is supported has a type identifier (TypeID), whether it is a scripting environment type, a host type, or a custom type. A type identifier may be encoded in grammar, may be extracted from the script engine, script host or a foreign program to extend the grammar, or the like.

7. In one implementation, date objects may be represented by eight (or some other number of) bytes that represent a data in milliseconds from a configurable time. For Date objects, date values are calculated based on:

A. Time is measured in milliseconds since 1 Jan. 1970 UTC. In time values, leap seconds are ignored. It is assumed that there are exactly 86,400,000 milliseconds per day. Using 8 bytes, binary values may represent all integers from −9,007,199,254,740,991 to 9,007,199,254,740,991. This range may be used to measure time to millisecond precision for any instant that is within approximately 28,561 years, either forward or backward, from 1 Jan. 1970 UTC.

B. The exact moment of midnight at the beginning of 1 Jan. 1970 UTC is represented by the value +0.

8. A type identifier may be omitted for certain values of a type native to the scripting environment. In particular:

A. Not a Number (NaN). NaN is a range of values. NaN may be represented as all bits on the exponent are 1's with a nonzero significand. There is no distinction for a signed NaN.

B. Positive infinity. Positive infinity may be represented by an 8 byte unsigned integer in hexadecimal as 0x7FF0000000000000.

C. Negative infinity. Negative infinity may be represented by an 8 byte unsigned integer in hexadecimal as 0xFFF0000000000000.

D. Maximum value. A value that represents a maximum value may be represented by an 8 byte unsigned integer in hexadecimal as 0x7FEFFFFFFFFFFFFF.

E. Minimum value. A value that represents a minimum value that may be represented by an 8 byte unsigned integer in hexadecimal as 0x0000000000000001.

F. Negative zero. A value that represents negative zero (or zero from the negative side) may be represented by an 8 byte unsigned integer in hexadecimal as 0x8000000000000000.

In other embodiments, one or more of the values and sizes mentioned above or elsewhere may be different.

An exemplary grammar is given below. In the exemplary grammar, bolded entries indicate that the entry is a non-leaf rule that may be constructed using a rule that follows the entry after a "::". For example, SerializationFormat is bolded and followed by "Header" and "Value". This means that SerializationFormat may be constructed by the Header and Value rules that are defined in the grammar. The header rule indicates that the header may be constructed by 3 leaf rules. The values in parenthesis indicate how many bytes to use to store data corresponding to a rule. Following is the exemplary grammar.

SerializationFormat::
   Header Value
Header (4 bytes)::
   MajorVersion (1 byte) MinorVersion (1 byte) HeaderReserved (2 bytes)
   Value:: one of
     Primitive
     BuiltInObject
     Object
     Array
     ObjectReference
     TypedArray
     HostObject
Primitive:: one of
   NullValue
   UndefinedValue
   TrueValue
   FalseValue
   Int32Value
   DoubleValue
   StringValue
     NullValue::
       NullValueTypeId (4 bytes)
     UndefinedValue::
       UndefinedValueTypeId (4 bytes)
     TrueValue::
       TrueValueTypeId (4 bytes)
     FalseValue::
       FalseValueTypeId (4 bytes)
     Int32Value::
       Int32ValueTypeId (4 bytes) Int32 (4 bytes)
     DoubleValue::
       DoubleValueTypeId (4 bytes) Double (8 bytes)
     StringValue::
       StringValueTypeId (4 bytes) String
     String::
       StrByteLen (4 bytes) Str (StrByteLen bytes) StrPadding [4-(StrByteLen % 4) bytes]
BuiltInObject::one of
   BooleanTrueObject
   BooleanFalseObject
   DateObject
   NumberObject
   StringObject
   RegExpObject
   BooleanTrueObject::
     BooleanTrueObjectTypeId (4 bytes)
   BooleanFalseObject::
     BooleanFalseObjectTypeId (4 bytes)
   DateObject::
     DateObjectTypeId (4 bytes) DateValue (4 bytes)
   NumberObject::

```
        NumberObjectTypeId (4 bytes) NumberValue (8 bytes)
    StringObject::
        StringObjectTypeId (4 bytes) String
    RegExpObject::
        RegExpObjectTypeId (4 bytes) String RegExpFlags (4 bytes)
    Object::
        ObjectTypeId (4 bytes) Properties
    Properties::
        [PropertyName Value] PropertiesTerminator // [ ]
represents zero or more pairs
    PropertiesTerminator::
        0xFFFFFFFF
    PropertyName::
        String
    Array::one of
        DenseArray
        SparseArray
            DenseArray::
                DenseArrayTypeId(4 bytes) IndexedProperties
            NamedProperties
                IndexedProperties::
                    IndexedPropertiesLength (4 bytes) [Value] // [ ]
represents zero or more
                NamedProperties::
                    Properties
            SparseArray::
                SparseArrayTypeId (4 bytes) IndexedPropertiesLength (4
bytes)
                SSparseIndexedProperties NamedProperties
            SparseIndexedProperties::
                [SparseArrayIndex (4 bytes) Value]
                SparseIndexedPropertiesTerminator
    TypedArray::
        TypedArrayTypeId (4 bytes) ArrayBuffer TypedArrayByteOffset (4
bytes) TypedArrayLength (4 bytes)
    ArrayBuffer::
        ArrayBufferTypeId (4 bytes) ArrayBufferLength (4 bytes)
    ByteArrayData ByteArrayPadding
        ByteArrayData::[bytes] // 0 or more bytes
    TypedArrayTypeId::
            Int8TypedArrayId
            Uint8TypedArrayId
            Int16TypedArrayId
            Uint16TypedArrayId
            Int32TypedArrayId
            Uint32TypedArrayId
            Float32TypedArrayId
            Float64TypedArrayId
            DataViewTypeId
    CanvasPixelArray::
        CanvasPixelArrayTypeId (4 bytes) CanvasPixelArrayLength (4
bytes) ByteArrayData ByteArrayPadding
    ObjectReference::
        ReferenceTypeId (4 bytes) ReferenceOffset (4 bytes)
    //TypeIds::Each Type to have a different numeric identifier
    ReservedTypeId::0
    ReferenceTypeId::1
    //TypeIDs for Primitives
    NullValueTypeId::2
    UndefinedValueTypeId::3
    TrueValueTypeId::4
    FalseValueTypeId::5
    Int32ValueTypeId::6
    DoubleValueTypeId::7
    StringValueTypeId::8
    //TypeIDs for BuiltInObjects
    BooleanTrueObjectTypeId::21
    BooleanFalseObjectTypeId::22
    DateObjectTypeId::23
    NumberObjectTypeId::24
    StringObjectTypeId::25
    RegExpObjectTypeId::26
    //TypeIDs for Objects
    ObjectTypeId::27
    //TypeID for Arrays
    DenseArrayTypeId::50
    SparseArrayTypeId::51
    CanvasPixelArrayTypeId::52
    //TypeIDs for TypedArrays
    ArrayBufferTypeId::60
    Int8TypedArrayId::61
    Uint8TypedArrayId::62
    Int16TypedArrayId::63
    Uint16TypedArrayId::64
    Int32TypedArrayId::65
    Uint32TypedArrayId::66
    Float32TypedArrayId::67
    Float64TypedArrayId::68
    DataViewTypeId::69
    //TypeIDs for Host Objects
    HostObjectTypeId::100
    BlobObjectTypeId::101
    FileObjectTypeId::102
    ImageDataObjectTypeId::103
    FileListObjectTypeId::104
    StreamObjectTypeId::105
    //Version info
    MajorVersion::8bit integer     //start with 1; increment with each
breaking public release
    MinorVersion::8bit integer     //start with 0; increment with each
public milestone release
    //Other variable data
    HeaderReserved::0              //Reserving 2 bytes in the header
for contextual information and future extensibility
    ReferenceOffset::uint32        //offset of a duplicate's primary
object in Data
    Int32::int32            //integer value stored in a primitive number
    Double::double          //double value stored in a primitive number
    StrByteLen::uint32      //byte Length of a string, based on UTF-16
format (2 bytes per char)
    Str::string             //actual string value
    StrPadding::0 //used to ensure that StringValue is 4-byte aligned
    DateValue::double       //result of calling valueOf on a Date
object (format rules below)
    NumberValue::double     //value stored in Number Object
    RegExpFlags::int32      //indexed to represent "global",
"ignoreCase", "multiline"
    PropertiesLength::uint32        //number of named properties
    IndexedPropertiesLength::uint32 //Length of indexed properties in
an array
    ByteArrayPadding::0             //used to ensure that ByteArrayData
is 4-byte aligned
    TypedArrayLength::uint32        //Length of byte array
    TypedArrayByteOffset::uint32    //ByteOffset for the TypedArray
object
    ArrayBufferLength::uint32       //Length of underlying buffer for
the TypedArray
    SparseArrayIndex::uint32        //valid index in the array
    SparseIndexedPropertiesTerminator::0xFFFFFFFF
```

Below are some examples of using the grammar above to serialize objects supported by a scripting environment into serialized data.

1. For the object: var o="hello world", an example of serialized data that represents the object is:

```
            Major Version
                Layout:   1 byte
                Actual Stream:   1
            Minor Version
                Layout:   1 byte
                Actual Stream:   0
            HeaderReserved
                Layout: 2 bytes
                Actual Stream: 0
            StringValueTypeID
                Layout:   4 bytes
                Actual Stream:   8
            StrByteLen
                Layout:   4 bytes
                Actual Stream:   22
            Str
                Layout:   22 bytes
                Actual Stream:   "hello world"
            StrPadding
```

>Layout: 2 bytes
>Actual Stream: 0

2. For the object: var o=42, an example of serialized data that represents the object is:

>Major Version
>>Layout: 1 byte
>>Actual Stream: 1
>
>Minor Version
>>Layout: 1 byte
>>Actual Stream: 0
>
>HeaderReserved
>>Layout: 2 bytes
>>Actual Stream: 0
>
>Int32ValueTypeId
>>Layout: 4 bytes
>>Actual Stream: 6
>
>Int32
>>Layout: 4 bytes
>>Actual Stream: 42

3. For the object: var o=new String("hello world"), an example of serialized data that represents the object is:

>Major Version
>>Layout: 1 byte
>>Actual Stream: 1
>
>Minor Version
>>Layout: 1 byte
>>Actual Stream: 0
>
>HeaderReserved
>>Layout: 2 bytes
>>Actual Stream: 0
>
>StringObjectTypeID
>>Layout: 4 bytes
>>Actual Stream: 25
>
>StrByteLen
>>Layout: 4 bytes
>>Actual Stream: 22
>
>Str
>>Layout: 22 bytes
>>Actual Stream: "hello world"
>
>StrPadding
>>Layout: 2 bytes
>>Actual Stream: 0

4. For the object: var obj={a: "hello world", bb: 42}; obj.ccc=obj, an example of serialized data that represents the object is:

>Major Version
>>Layout: 1 byte
>>Actual Stream: 1
>
>Minor Version
>>Layout: 1 byte
>>Actual Stream: 0
>
>HeaderReserved
>>Layout: 2 bytes
>>Actual Stream: 0
>
>ObjectTypeID
>>Layout: 4 bytes
>>Actual Stream: 27
>
>StrByteLen
>>Layout: 4 bytes
>>Actual Stream: 2
>
>Str
>>Layout: 2 bytes
>>Actual Stream: "a"
>
>StrPadding
>>Layout: 2 bytes
>>Actual Stream: 0
>
>StringValueTypeId
>>Layout: 4 bytes
>>Actual Stream: 8
>
>StrByteLen
>>Layout: 4 bytes
>>Actual Stream: 22
>
>Str
>>Layout: 22 bytes
>>Actual Stream: "hello world"
>
>StrPadding
>>Layout: 2 bytes
>>Actual Stream: 0
>
>StrByteLen
>>Layout: 4 bytes
>>Actual Stream: 4
>
>Str
>>Layout: 4 bytes
>>Actual Stream: "bb"
>
>Int32ValueTypeId
>>Layout: 4 bytes
>>Actual Stream: 6
>
>Int32
>>Layout: 4 bytes
>>Actual Stream: 42
>
>StrByteLen
>>Layout: 4 bytes
>>Actual Stream: 6
>
>Str
>>Layout: 6 bytes
>>Actual Stream: "ccc"
>
>StrPadding
>>Layout: 2 bytes
>>Actual Stream: 0
>
>ReferenceTypeId
>>Layout: 4 bytes
>>Actual Stream: 1
>
>ReferenceOffset
>>Layout: 4 bytes
>>Actual Stream: 4
>
>PropertiesTerminator
>>Layout: 4 bytes
>>Actual Stream: 0xFFFFFFFF 5. For the object: var obj={a: new String("hello world"), bb: {xxx: 42}}; obj.bb.ccc=obj, an example of serialized data that represents the object is:

>Major Version
>>Layout: 1 byte
>>Actual Stream: 1
>
>Minor Version
>>Layout: 1 byte
>>Actual Stream: 0
>
>HeaderReserved
>>Layout: 2 bytes
>>Actual Stream: 0
>
>ObjectTypeID
>>Layout: 4 bytes
>>Actual Stream: 27
>
>StrByteLen
>>Layout: 4 bytes
>>Actual Stream: 2
>
>Str
>>Layout: 2 bytes
>>Actual Stream: "a"
>
>StrPadding
>>Layout: 2 bytes
>>Actual Stream: 0
>
>StringObjectTypeId
>>Layout: 4 bytes
>>Actual Stream: 25
>
>StrByteLen
>>Layout: 4 bytes
>>Actual Stream: 22

```
    Str
        Layout:    22 bytes
        Actual Stream:  "hello world"
    StrPadding
        Layout:    2 bytes
        Actual Stream:  0
    StrByteLen
        Layout:    4 bytes
        Actual Stream:  4
    Str
        Layout:    4 bytes
        Actual Stream:  "bb"
    ObjectTypeId
        Layout:    4 bytes
        Actual Stream:  27
    StrByteLen
        Layout:    4 bytes
        Actual Stream:  6
    Str
        Layout:    6 bytes
        Actual Stream:  "xxx"
    StrPadding
        Layout:    2 bytes
        Actual Stream:  0
    Int32ValueTypeId
        Layout:    4 bytes
        Actual Stream:  6
    Int32
        Layout:    4 bytes
        Actual Stream:  42
    StrByteLen
        Layout:    4 bytes
        Actual Stream:  6
    Str
        Layout:    6 bytes
        Actual Stream:  "ccc"
    StrPadding
        Layout:    2 bytes
        Actual Stream:  0
    ReferenceTypeId
        Layout:    4 bytes
        Actual Stream:  1
    ReferenceOffset
        Layout:    4 bytes
        Actual Stream:  4
    PropertiesTerminator
        Layout:    4 bytes
        Actual Stream:  0xFFFFFFFF
    PropertiesTerminator
        Layout:    4 bytes
        Actual Stream:  0xFFFFFFFF
```

Below is an example of using the grammar above to serialize an object supported by a host environment into serialized data. For this example, let var flist=document.getElementById('fileUploadElement').filelist. Then let var obj={a: flist, b: flist[0]}. For this, an example of serialized data that represents the object is:

```
    Major Version
        Layout:   1 byte
        Actual Stream:  1
    Minor Version
        Layout:   1 byte
        Actual Stream:  0
    HeaderReserved
        Layout: 2 bytes
        Actual Stream: 0
    ObjectTypeID
        Layout:    4 bytes
        Actual Stream:  27
    StrByteLen
        Layout:    4 bytes
        Actual Stream:  2
    Str
        Layout:    2 bytes
        Actual Stream:  "a"
    StrPadding
        Layout:    2 bytes
        Actual Stream:  0
    FileListObjectTypeId
        Layout:    4 bytes
        Actual Stream:  104
    StrByteLen
        Layout:    4 bytes
        Actual Stream:  2
    Str
        Layout:    2 bytes
        Actual Stream:  "0"
    StrPadding
        Layout:    2 bytes
        Actual Stream:  0
    FileListObjectTypeId
        Layout:    4 bytes
        Actual Stream:  102
    StrByteLen
        Layout:    4 bytes
        Actual Stream:  8
    Str
        Layout:    2 bytes
        Actual Stream:  "name"
    StringValueTypeId
        Layout:    4 bytes
        Actual Stream:  8
    StrByteLen
        Layout:    4 bytes
        Actual Stream:  14
    Str
        Layout:    2 bytes
        Actual Stream:  "foo.txt"
    StrPadding
        Layout:    2 bytes
        Actual Stream:  0
    StrByteLen
        Layout:    4 bytes
        Actual Stream:  32
    Str
        Layout:    2 bytes
        Actual Stream:  "lastModifiedDate"
    DateObjectTypeId
        Layout:    4 bytes
        Actual Stream:  23
    DateValue
        Layout:    4 bytes
        Actual Stream:  4/18/2011 (as double)
    StrByteLen
        Layout:    4 bytes
        Actual Stream:  8
    Str
        Layout:    2 bytes
        Actual Stream:  "type"
    StringValueTypeId
        Layout:    4 bytes
        Actual Stream:  8
    StrByteLen
        Layout:    4 bytes
        Actual Stream:  20
    Str
        Layout:    2 bytes
        Actual Stream:  "text/plain"
    StrByteLen
        Layout:    4 bytes
        Actual Stream:  8
    Str
        Layout:    2 bytes
        Actual Stream:  "size"
    DoubleValueTypeId
        Layout:    4 bytes
        Actual Stream:  7
    Double
        Layout:    8 bytes
        Actual Stream:  432
```

-continued

```
    PropertiesTerminator
        Layout:  4 bytes
        Actual Stream:  0xFFFFFFFF
    PropertiesTerminator
        Layout:  4 bytes
        Actual Stream:  0xFFFFFFFF
    StrByteLen
        Layout:  4 bytes
        Actual Stream:  2
    Str
        Layout:  2 bytes
        Actual Stream:  "b"
    StrPadding
        Layout:  2 bytes
        Actual Stream:  0
    ReferenceTypeId
        Layout:  4 bytes
        Actual Stream:  1
    ReferenceOffset
        Layout:  4 bytes
        Actual Stream:  28
```

Based on the teachings herein, those skilled in the art will recognize many other objects and the serialized data representations that may be created therefrom without departing from the spirit or scope of aspects of the subject matter described herein.

Figure 3:
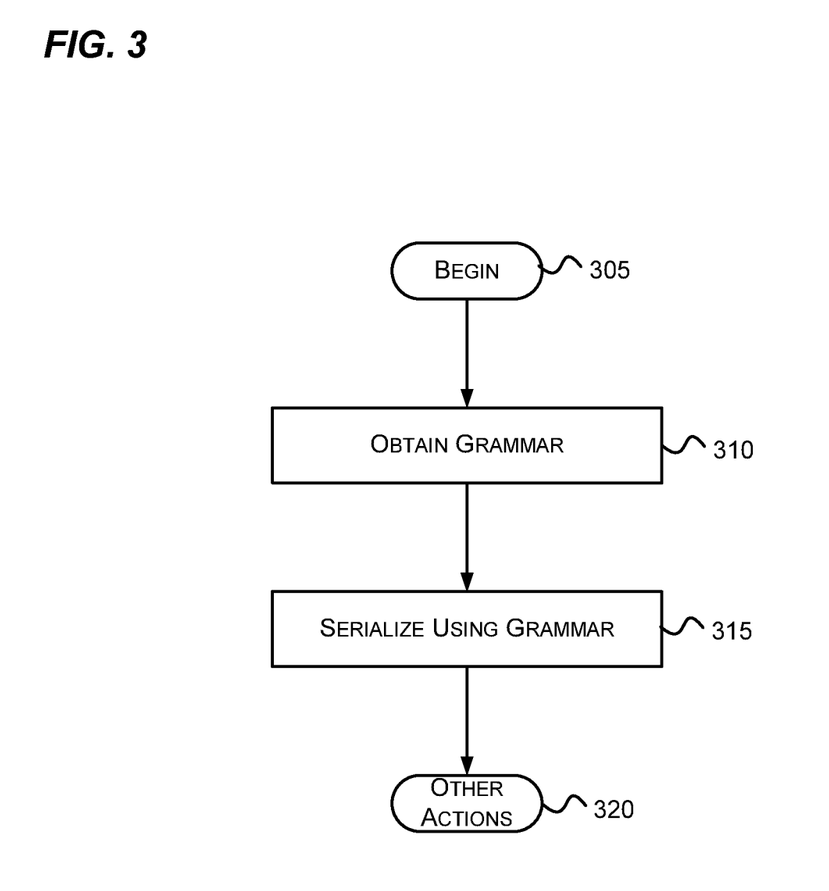
FIGS. 3-4 are flow diagrams that generally represent exemplary actions that may occur in accordance with aspects of the subject matter described herein.
Figure 4:
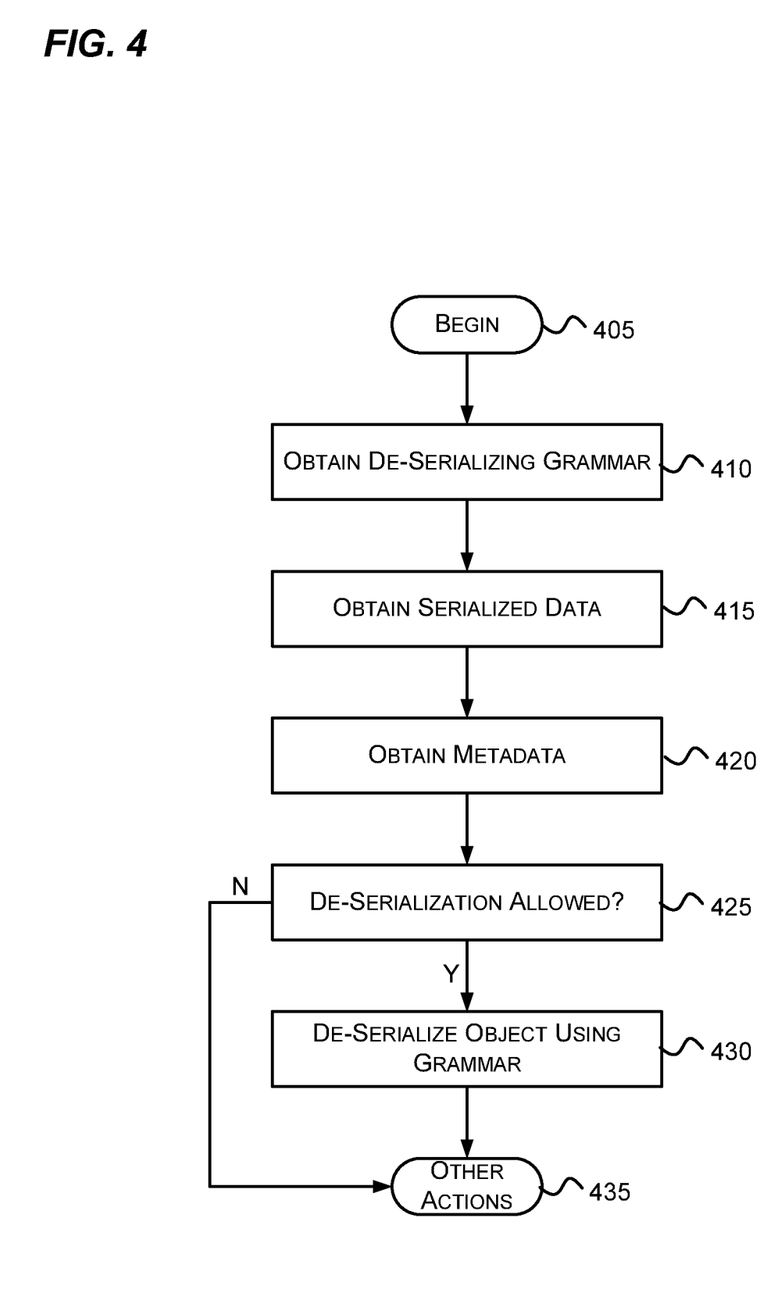

FIGS. 3-4 are flow diagrams that generally represent exemplary actions that may occur in accordance with aspects of the subject matter described herein. For simplicity of explanation, the methodology described in conjunction with FIGS. 3-4 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 3, at block 305, the actions begin. At block 310, the grammar is obtained. For example, referring to FIG. 2, the serialization engine 215 obtains the grammar 225. The grammar may be obtained from nonvolatile memory, volatile memory, or some combination thereof. In one implementation, obtaining the grammar includes retrieving code that implements the grammar. In another implementation, obtaining the grammar may include retrieving a set of rules from a store and executing code that uses the rules to implement the grammar.

At block 315, the grammar is used to serialize the object into serialized data. For example, referring to FIG. 2, the serialization engine 215 may execute code that implements grammar 225 to serialize the object 210 into the serialized data 235.

At block 320, other actions, if any, may occur. For example, in one implementation, the grammar itself may be encoded into the serialized data so that an entity receiving the serialized data may read the grammar from the serialized data and use the grammar to de-serialize the serialized data.

Turning to FIG. 4, at block 405, the actions begin. At block 310, a de-serializing grammar is obtained. For example, referring to FIG. 2, the deserialization engine 216 may obtain the grammar 226. The deserialization engine 216 may obtain the grammar 226 from nonvolatile memory, volatile memory, or some combination thereof. In one implementation, the grammar 226 is obtained from the serialized data 235 itself. In another implementation, the grammar 226 is obtained from a source other than the serialized data 235. For example, the grammar 226 may be obtained from a store accessible by the scripting environment 221.

At block 415 serialized data is obtained. For example, referring to FIG. 2, the serialized data 235 is obtained.

At block 420, metadata of the grammars used to serialize is obtained. For example, referring to FIG. 2, the de-serialization engine 216 may obtain the version of the grammar 225 by retrieving the version from the header of the serialized data 235. The de-serialization engine 216 may obtain its own version from a data structure.

At block 425, if de-serialization is allowed based on the metadata, the actions continue at block 430; otherwise, the actions continue at block 435. Determining whether the versions of the grammars are close enough to allow de-serialization may be made by applying a rule (e.g., major versions are the same, but minor versions can be different).

At block 430, the grammar is de-serialized. For example, referring to FIG. 2, the deserialization engine 216 may de-serialize the serialized data 235 and call on the host de-serialization engine 231 to de-serialize host and foreign objects as needed.

At block 435, other actions, if any, may be performed.

As can be seen from the foregoing detailed description, aspects have been described related to serializing and de-serializing objects. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

obtaining a grammar that defines a format for serializing an object, the grammar representing rules for serializing the object that preserve embedded objects and relationships in a serialized representation of the object, the grammar defining a header and a payload for serializing the object, the header including metadata for the grammar, the metadata usable in de-serializing objects serialized using the grammar, the grammar having rules for de-serializing the object based on a difference between a minor version of a serialization engine to serialize the object and a minor version of a de-serialization engine to de-serialize the object and a difference between a major version of the serialization engine to serialize the object and a major version of the de-serialization engine to de-serialize the object, the payload including an identifier of each descendent object of the object, the payload further including reference data for each reference, if any, included in the object, the reference data indicating relationships of the object, the reference data potentially referring to one or more of: an object type supported by a scripting environment in which the object resides, an object type supported by a host environment of the scripting environment, and a foreign object type that is defined outside of both the scripting environment and the host environment; and serializing the object into serialized data by executing code that implements the grammar.

2. The method of claim 1, wherein obtaining a grammar comprises obtaining a grammar that specifies an ordering of bits within the serialized data such that the ordering of the bits within the serialized data to represent the object is independent of a processing architecture of the computer.

3. The method of claim 1, wherein obtaining the grammar comprises retrieving the code from a store.

4. The method of claim 1, wherein obtaining the grammar comprises retrieving a set of rules from a store.

5. The method of claim 1, further comprising encoding the grammar into the serialized data such that an entity receiving the serialized data is allowed to read the grammar from the serialized data and use the grammar to de-serialize the serialized data.

6. The method of claim 1, wherein the grammar further defines a date format that includes at least eight bytes that represent a date in milliseconds from a configurable time.

7. The method of claim 1, wherein serializing the object comprises aligning each value of the object on a byte boundary of selectable length.

8. The method of claim 1, wherein serializing the object comprises representing each character of the object, if any, with two or more bytes.

9. The method of claim 1, further comprising:
obtaining the grammar from the serialized data;
de-serializing the serialized data by executing code that implements the grammar.

10. In a computing environment, a system, comprising:
a store operable to provide access to a grammar, the grammar defining a format for serializing an object, the grammar representing rules for serializing the object that preserve embedded objects and relationships in a serialized representation of the object, the grammar defining a header and a payload for serializing the object, the header including metadata of the grammar the metadata usable in de-serializing objects serialized using the grammar, the grammar having rules for de-serializing the objects based on a difference between a minor version of a first serialization engine to serialize the object and a minor version of a first de-serialization engine to de-serialize the object and a difference between a major version of the first serialization engine to serialize the object and a major version of the first de-serialization engine to de-serialize the object, the payload including an identifier of each descendent object of the object, the payload further including reference data for each reference, if any, included in the object, the reference data indicating relationships of the object, the reference data potentially referring to one or more of: an object type supported by a scripting environment in which the object resides, an object type supported by a host environment of the scripting environment, and a foreign object type that is defined outside of both the scripting environment and the host environment; and
the first serialization engine operable to use the grammar to serialize the object into serialized data.

11. The system of claim 10, wherein the first serialization engine is hosted in a scripting environment operable to execute scripts.

12. The system of claim 10, further comprising a second serialization engine operable to use the grammar to serialize host objects that are referenced by the object.

13. The system of claim 12, wherein the second serialization engine is further operable to serialize foreign objects that are defined outside of the scripting environment and the host environment.

14. The system of claim 12, wherein the first serialization engine being operable to use the grammar to serialize the object into serialized data comprises the first serialization engine being operable to generate serialized data having an order defined by the grammar, the order independent of a processing architecture upon which the first serialization engine executes.

15. The system of claim 10, further comprising a deserialization engine operable to use another grammar to attempt de-serialize the serialized data to create the object in a destination environment.

16. The system of claim 15, wherein the deserialization engine is further operable to obtain a version of the grammar from the metadata, the version used to create the serialized data, the deserialization engine further operable to compare the version to a version of the another grammar.

17. The system of claim 16, wherein the deserialization engine is further operable to refrain from de-serializing the serialized data if the version of the grammar used to create the serialized data is more than a minor version different than the version of the another grammar.

18. A computer storage medium having computer-executable instructions, which when executed perform actions, comprising:
obtaining a grammar that defines a format for serializing an object, the grammar representing rules for serializing the object that preserve embedded objects and relationships in a serialized representation of the object, the grammar defining a header and a payload for serializing the object, the header including metadata of the grammar, the payload including an identifier of each descendent object of the object, the payload further including reference data for each reference, if any, included in the object, the reference data indicating relationships of the object, the reference data potentially referring to one or more of: an object type supported by a scripting environment in which the object resides, an object type supported by a host environment of the scripting environment, and a foreign object type that is defined outside of both the scripting environment and the host environment; and
obtaining serialized data that has been generated using a version of the grammar;
de-serialize the serialized data to create a de-serialized representation of the object based on a difference between a minor version of a serialization engine to serialize the object and a minor version of a de-serialization engine to de-serialize the object and a difference between a major version of the serialization engine to serialize the object and a major version of the de-serialization engine to de-serialize the object.

19. The computer storage medium of claim 18, further comprising comparing a version by which the serialized data was generated against a version of the de-serializing grammar and applying a rule to determine whether to de-serialize the serialized data, the version by which the serialized data was generated included in the metadata.

20. The computer storage medium of claim 18, wherein obtaining the grammar comprises obtaining the grammar from the serialized data.

* * * * *